INVENTOR.
Cecil E. Adams
BY
Herschel C. Omohundro
attorney

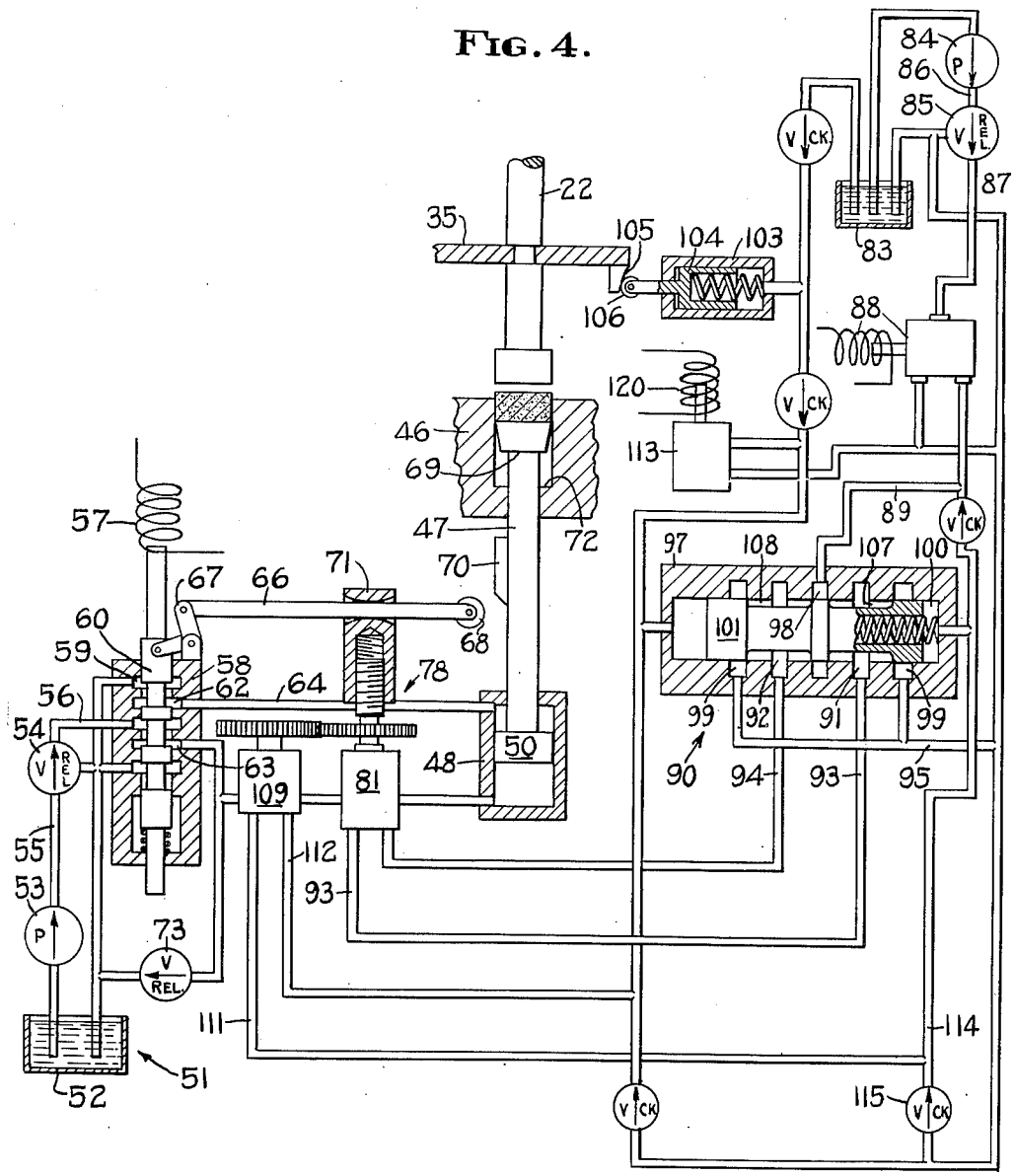

Patented Nov. 25, 1952

2,618,833

UNITED STATES PATENT OFFICE 2,618,833

APPARATUS FOR FORMING CERAMIC ARTICLES

Cecil E. Adams, Columbus, Ohio, assignor to The Denison Engineering Company, Columbus, Ohio, a corporation of Ohio Application September 9, 1949, Serial No. 114,742

14 Claims. (Cl. 25—45)

This invention relates generally to the formation of articles from ceramic materials and is more particularly directed to a method and apparatus for automatically forming tile or other ceramic articles.

The first object of this invention is to provide apparatus for automatically forming ceramic articles having predetermined dimensions and density.

It has been observed in the manufacture of ceramic articles from powered materials that to be of best quality, an article of predetermined size and shape should contain a set quantity of the powdered material compacted to a fixed degree; that such compaction should be the result of a series of successive, independent, pressing impulses of relatively moderate force each of which causes some reduction in the thickness of the article, rather than one pressing impulse of a much higher force. With these observations in mind it is an object of the present invention to provide apparatus for automatically forming articles of powdered ceramic materials which will introduce a quantity of powdered material to a mold, compress such material in the mold with a series of pressing impulses until an article of given dimensions has been formed, discontinue the pressing operation, eject the formed article, and automatically adjust parts of the apparatus to change the quantity of material supplied for the next article if more or less than an optimum number of pressing impulses were required to compact the article just formed to the desired size.

Another object of the invention is to provide a hydraulic press having a reciprocating ram and means for causing the ram to automatically deliver a series of pressing impulses to a mass of powdered material disposed in a mold to form an article therefrom and utilizing the number of impulses applied to form one article to control the amount of powdered material introduced into the mold to form a succeeding article.

An object of the invention also is to provide a hydraulic press having apparatus for causing the press ram to impart a series of pressing impulses to a quantity of powdered material in a mold to progressively reduce the thickness of the article until it has reached a selected dimension then interrupt the pressing impulses to permit the removal of the formed article, each of the pressing impulses being of the same force and the number being determined by the quantity of powder introduced prior to the initiation of the pressing cycle, the apparatus being provided with means for limiting the number of pressing impulses executed in any one cycle even though the article may not have been reduced to the exact dimension desired.

A still further object of the invention is to provide a hydraulic press of the type illustrated in copending application Serial No. 25,948 filed May 7, 1948, now Patent No. 2,569,214, with means for hydraulically ejecting a formed article from a mold and utilizing the ejecting mechanism to regulate the quantity of material introduced into a mold to form the next article.

Another object of the invention is to provide a hydraulic press with a mold and a knock-out mechanism and to provide adjustable means for stopping the knock-out mechanism in its retractive movement to regulate the volume of the mold for the reception of a charge of material from which a succeeding article is formed.

Another object of the invention is to provide apparatus of the type set forth in the preceding paragraph with a fluid motor for adjusting the knock-out stopping mechanism and a valve for automatically controlling the flow of fluid to the fluid motor, such valve being actuated by the movement of the press ram during the formation of an article, the valve being of a delayed action type which permits it to be set during the formation of one article and operated, upon the completion of such article, to adjust the knock-out ram stopping mechanism to vary the quantity of material supplied to the mold for the next succeeding article.

Another object of the invention is to provide a hydraulic press of the type shown and described in the above mentioned copending application with a mold and a knock-out mechanism and means for interrupting the retraction of the knock-out mechanism to regulate the quantity of the material applied to the mold for the formation of another article, the means for interrupting the retraction of the knock-out being hydraulically operated and having a hydraulic circuit including a valve which is moved step-by-step in a certain direction upon the reciprocation of the press ram, a predetermined number of reciprocations of the ram serving to place the valve in such a position that the knock-out stopping mechanism will be maintained in a certain position, a lesser number of reciprocations placing the valve in a position so the knock-out stopping mechanism will be adjusted in one direction and a greater number of reciprocations causing the valve to be adjusted to move the knock-out stopping means in another direction. This mechanism will thus compensate for the introduction of too little or too much raw material, depending upon the density of the article being produced to determine the density of the next succeeding article.

It is also an object of the invention to provide apparatus of the type mentioned in the preceding paragraph with a valve which is normally disposed in a position to cause the stop mechanism to be adjusted in one direction, such valve being moved in response to the movement of the press ram, a predetermined extent of movement of the ram placing the valve in position to prevent the operation of the mechanism for adjusting the means for interrupting the retraction of the knock-out, more or less than the predetermined extent of movement of the ram serving to place the valve in position to operate the stop mechanism in one direction or another, thus permitting the knock-out mechanism to move a greater or lesser extent to increase or decrease the volume of the mold prior to the introduction of the ceramic material thereto.

It is an object of the invention to provide a press of the type shown and described in the above-mentioned copending application, with a knock-out mechanism operated by a hydraulic power unit having a piston and cylinder, the introduction of fluid to the cylinder to cause the operation of the piston being controlled by a spring off-set solenoid valve, means being provided to cause the knock-out to move the valve to a centered position during retractive movement of the knock-out, the centered position of the valve serving to interrupt the flow of fluid to the knock-out operating cylinder and stop the knock-out piston during retraction thereof with the knock-out ram in position to fix the volume of the mold for the reception of a charge of material which will permit the formation of a body having a density more nearly approaching a predetermined figure.

It is a further object of the invention to provide apparatus of the type mentioned in the preceding paragraph with means for adjusting the valve operating mechanism to vary the extent of retractive movement of the knock-out, the adjusting mechanism including a fluid motor, a hydraulic circuit, a spring off-set, four-way valve and a pump operated by the movement of the press ram to supply fluid to the spring off-set, four-way valve to move the same in opposition to its spring a greater or lesser extent in response to the number of reciprocations of the press ram or the distance moved thereby, the extent of movement of the valve determining the length of time and the direction in which the fluid motor will operate, the hydraulic system also including valve means for resetting the system for a subsequent operation upon the completion of a return stroke of the press ram.

Further objects and advantages of the present invention will be apparent from the following description, reference being had to the accompanying drawings wherein a preferred form of embodiment of the invention is clearly shown.

In the drawings:

Fig. 4 is also a view similar to Fig. 2 with the parts shown in still other positions of movement, the formed article being in a partially ejected position.

Figure 1:
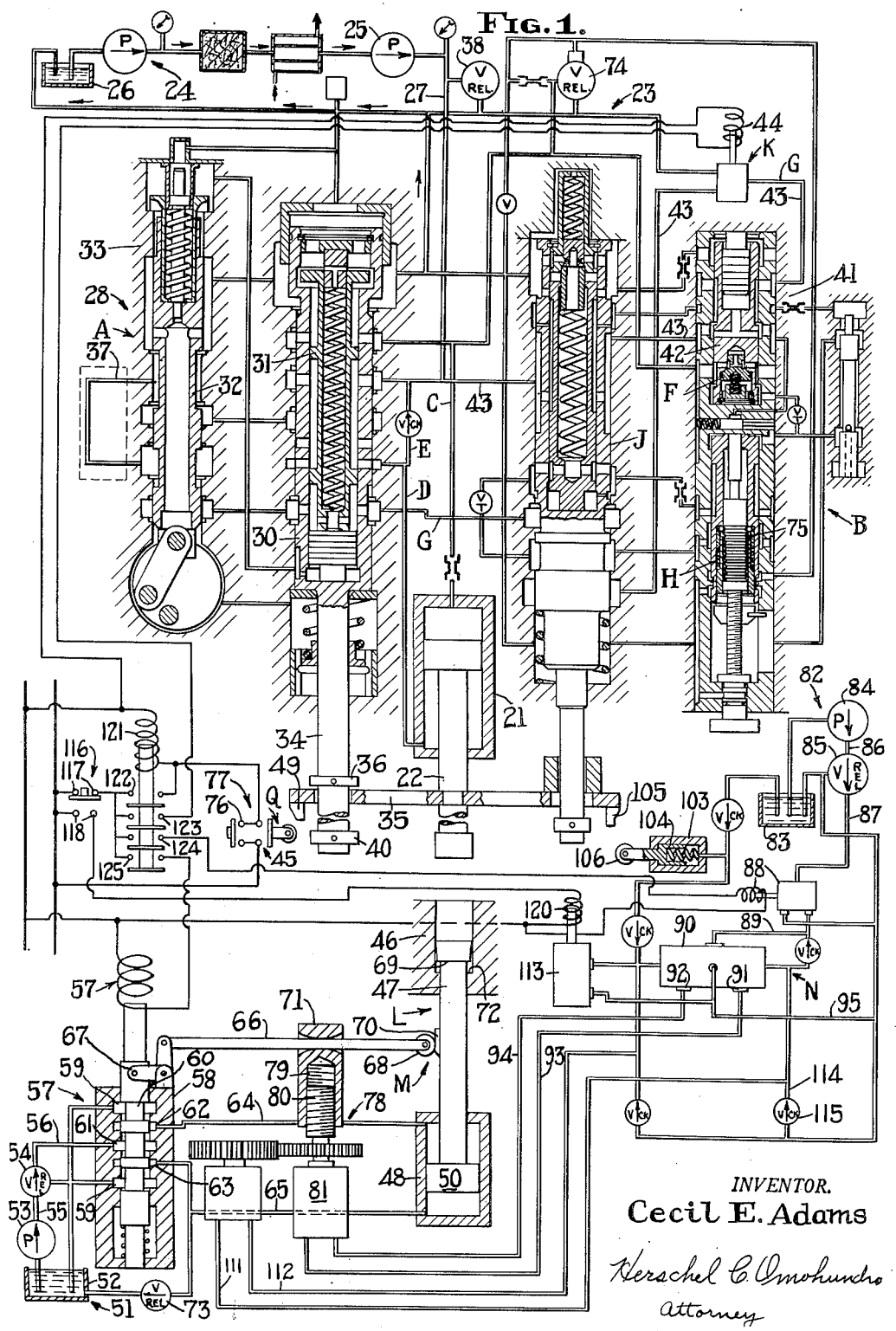
Fig. 1 is a diagrammatic view of a composite hydraulic system employed in ceramic material-forming apparatus formed in accordance with the present invention.

Referring more particularly to the drawings and especially to Fig. 1 thereof, there has been illustrated the hydraulic system of an automatic press of the type shown in the copending application above-mentioned to which has been applied additional apparatus for carrying out the present invention. The details of construction of the press are not shown in the present application, since no claims herein are directed specifically thereto but it is believed that a sufficient understanding of the knock-out construction and operation of the press and its association with the present invention can be obtained from the circuit diagram shown in the accompanying drawings. Reference may be made to the copending application for details of construction of the press, not specifically shown or described herein.

As will be determined from an inspection of the copending application and reference to Fig. 1, the press to which the invention herein is applied includes a power cylinder 21 and a ram 22; the press also includes a hydraulic circuit designated generally by the numeral 23 for controlling the operations of the power cylinder and ram. The circuit 23 includes a source of fluid pressure 24 having a high pressure pump 25 and a reservoir 26 from which fluid is drawn by the pump 25, the fluid being forced by the pump through line 27 to an automatic control valve mechanism 28. This control valve mechanism is illustrated in detail in the copending application above-mentioned. It includes valve elements 30, 31, and 32, which are movable in a housing section 33, to effect the automatic reciprocation of the press ram 22 in the power cylinder 21, the valve 32 being employed to initiate the operation of the ram and being capable of being set in such a position as to cause the cycle of operation of the ram to be repeated an indefinite number of times.

The general principles of operation of the automatic press section of the apparatus are substantially the same as in the press shown in the copending application. They will be briefly summarized here to facilitate the understanding of the present invention. The control valve mechanism 28 includes two main parts A and B, the first of which functions to cause the automatic reciprocation of the ram 22 in the power cylinder 21. The section B of the valve mechanism 28 functions to cause the ram to execute one or a series of rapidly executed pressing impulses at the termination of the initial pressing impulse. The valve section A includes the valve elements 30, 31, and 32, as mentioned above, which move in the valve casing to control fluid flow to and from the power cylinder. Valve elements 32 may be manually set to cause fluid supplied by pump 25 to flow to the space beneath the lower end of the valve element 31 to cause this element to move to an elevated position in which line 27 will be connected directly with line C, which leads to the upper end of the power cylinder. When element 31 is in this position, line D leading from the lower end of the power cylinder is connected with the system reservoir 26 so that fluid discharged from the lower end of the power cylinder will be returned to such reservoir. As in the above-mentioned copending application a line E is provided in which a check valve is incorporated, this line serving to permit the fluid in the lower end of the power cylinder to be introduced to the line leading from the pump to the valve to cause the motion of the piston to be accelerated. Inasmuch as this feature forms no part of the novel subject matter of the present application, further discussion thereof is believed unnecessary.

The exhaust flow of fluid through line D to the reservoir is resisted to create a back pressure which is applied to the lower end of the valve element 31 to retain the same in the elevated position wherein the pump is connected with the upper end of the power cylinder; as long as the ram is being extended, this back pressure will be maintained. When the ram reaches an obstruction, however, which offers sufficient resistance to cause the ram to stop moving, this back pressure will be dissipated and valve element will be returned to the position shown in which the source of fluid pressure is connected to the lower end of the power cylinder and the upper end of the latter will be connected with the reservoir. At this time, the ram will be moved in an upward direction to a retracted position.

Thus far described, the valve mechanism will cause the ram to reciprocate through strokes of full length or less depending upon the material disposed in the path of the ram. If valve element 32 is properly adjusted the cycle of movement of the ram will be automatically repeated.

The section B of the valve mechanism is operative to cause the press ram to impart one or a plurality of short pressing impulses to the article undergoing formation to progressively reduce the thickness thereof. This section B includes an "on and off" valve element designated by the letter F which, when the ram starts to move in an upward or retracting direction, is moved to a position to direct fluid from the source of pressure through the line G to the lower end of the valve element 31 to cause this element to be elevated and again connect the source of fluid pressure to the upper end of the power cylinder. When this connection is established the retractive movement of the ram will be discontinued and the ram will again be extended. After the ram reaches the work and exerts its pressing force thereon the retractive movement will again be initiated through the lowering of the valve element 31. If the "on and off" valve is permitted to function again the retractive movement of the ram will again be interrupted causing the ram to execute another short pressing operation. These short pressing impulses will be continued as long as valve element F is permitted to operate.

The section B of the valve mechanism is provided with a counting mechanism H which may be set to interrupt the operation of valve F after a predetermined number of short pressing impulses have been executed. This mechanism H operates to prevent the movement of valve element F to an open position after the desired number of short pressing impulses have been executed and when valve F can no longer move to an open position, the ram will continue to be retracted until it moves valve element 30 to a position to interrupt communication between line 27 and line D leading to the lower end of the power cylinder. If valve element 32 is set to cause a single cycle of operation, the ram will remain in this position until another cycle is initiated. If valve element 32 is set for automatic operation, the cycle will be automatically repeated. When ram 22 moves to its fully retracted position, a valve sleeve J will be operated to cause the counting mechanism H to be re-set for the next succeeding cycle of operation. When this mechanism is re-set valve element F is also placed in condition for the next cycle of operation.

When the press thus far described is adapted to the present invention, the portion B is modified by the addition of a solenoid valve K, which is arranged in line G and operates to interrupt the execution of the short pressing impulses when the article undergoing formation reaches a predetermined thickness. If the number of pressing impulses for which the counting mechanism H has been set is insufficient to reduce the article to the predetermined thickness the series of short strokes will be interrupted by the mechanism H.

As previously mentioned the present invention has been conceived for the purpose of producing articles from powdered ceramic, or, similar materials, the articles to conform to a predetermined dimension and to possess a desired density. To secure both of these qualities, it is necessary to regulate the amount of powdered material introduced into the mold in which the article is formed. Many types of mechanism may be employed to secure these results. One form of mechanism has been diagrammatically illustrated in the drawings and comprises an ejector for moving a formed piece from the mold, this ejector being designated generally by the letter L. The mechanism is also equipped with means for stopping the ejector during its retraction, so that the end of the ejector will serve as a wall to regulate the capacity of the mold during the introduction of the powdered material for the next article. In the form of the invention selected for illustration, the means for stopping the ejector in its retractive stroke comprises an adjustable stop, indicated generally by the letter M, which includes valve means for controlling the flow of operating fluid to the power cylinder employed in moving the ejector. The stop mechanism is adjustable, the direction and extent of adjustment being controlled by a hydraulic mechanism indicated generally by the letter N. This hydraulic mechanism is in turn actuated by the movement of the ram, the number of strokes executed by the latter determining the direction and extent of adjustment of the stop mechanism. When the apparatus, indicated diagrammatically in Fig. 1 of the drawings, is operated, the stroke counting device H is set for a maximum number of short pressing impulses. A limit switch designated by the letter Q is set so that when the ram has reduced the article to a predetermined thickness, this switch will be operated to close the solenoid valve K. When this valve closes, the short stroke operation of the ram will be interrupted and the ram will return to its retracted position.

In the operation of the apparatus, powdered material is introduced into the mold to fill it level full, quantity of material being dependent upon the point at which the ejector ram is stopped during its retraction. If that quantity of material is too great for the ram to reduce the thickness of the article to the point where the limit switch Q is operated the stroke counting mechanism H will interrupt the short strokes after the number of strokes, for which this mechanism has been set, are completed. The ram will then return to its initial elevated or starting position and the operator must manually press a push button or similar switch to initiate the ejection of the formed article and the adjustment of the stop mechanism to change the quantity of powdered material supplied to the mold for the next article to be formed. During the performance of the short strokes, the ram also actuates the mechanism N placing it in condition to adjust the stop mechanism M for the next article-forming-operation. When a series of short strokes has been interrupted by the ram actuating the limit switch Q, the knock-out mechanism will operate automatically to eject the formed article and the mechanism N will automatically operate to adjust the stop mechanism M, this mechanism will be adjusted in a direction to cause the ejector ram to vary the volume of powdered material introduced into the mold for the next article. If the reduction of material caused by an excess during one cycle of the apparatus is insufficient, a further reduction will take place at the termination of the next cycle, the amount of reduction depending upon the number of strokes exceeding a predetermined number necessary to produce the desired article. If the stop adjusting mechanism has been operated to cause too great a reduction in the raw materials introduced into the mold, an insufficient number of vibratory pressing impulses will be executed and the mechanism N will be so set that upon the return of the main ram to its retracted position, the stop mechanism M will be adjusted to increase the volume of the mold. These adjustments are all performed automatically when the necessity for such an adjustment presents itself although as pointed out it is necessary to initiate them manually by closing a switch if the switch Q is not operated by the ram.

It will thus be seen that the quantity of material introduced will be increased or decreased until the desired density is attained, then the stop mechanism will remain stationary until some other condition changes, such as a variation in the powdered material, which will cause the density to change, at which time the mechanism N will become operative to again adjust the stop mechanism to compensate for the changed condition.

Valve element 30 is provided with a shipper rod 34 so that movement of the press ram may be transmitted to the element 30, in the operation of the press, to assist in causing the ram to automatically repeat its cycles of operation. The valve element 31 is urged in one direction by a spring and in the opposite direction by fluid under pressure applied thereto to move the same in opposition to its spring. When a cycle of operation of the press ram is to be initiated, valve element 32 is operated, by suitable mechanism, to direct fluid from the source to the under side of the element 31. This fluid will move valve element 31 against the force of its spring to a position wherein the source of fluid pressure is connected to the upper end of the power cylinder 21 while the lower end of such cylinder is connected with the reservoir. The ram will then be forced in a downward direction.

Before the movement of the ram is initiated the ram will be in a position in which a cross head 35 carried by the ram engages a collar 36 on the shipper rod 34 and holds the shipper rod in an elevated position in which the valve element 30 connects a line 37 controlled by valve 32 with the source of fluid pressure. After the ram movement is initiated, the valve element 30 will move to a position wherein communication between line 37 and the source of pressure is interrupted. The ram will continue to move until it engages an obstruction which offers sufficient resistance to the movement of the ram to cause a relief valve 38 to open and connect the source of fluid pressure with the reservoir 26. At this time valve element 31 will be operated by its spring to move to a position wherein the source of fluid pressure is connected with the bottom end of the power cylinder 21 at which time the fluid will then cause the ram to move in a reverse direction. If the ram does not engage an obstruction during advancing movement, this reverse movement will be initiated through the engagement of the cross head 35 with a second collar 40 on the shipper rod 34. When collar 40 is engaged by the cross head 35, valve element 30 will be moved in a downward direction to permit a groove near its upper end to connect the line leading to the upper end of the power cylinder 21 with the reservoir. After this connection is established the fluid pressure above the ram in the power cylinder will be dissipated and the ram will stop moving.

It is the motion of the ram in a downward direction and the fluid expelled thereby, which holds the valve element 31 in an elevated position to connect the source of fluid with the upper end of the power cylinder, therefore, when downward movement of the ram is discontinued no fluid will be expelled from the lower end of the power cylinder and the spring for the element 31 may then move it to a position wherein the lower end of the power cylinder is connected with the pressure source. The establishment of this connection initiates the retraction of the ram. Immediately prior to reaching the upper limit of its travel, the cross head will again engage the upper collar 36 and shift the valve element 30 to a position wherein the source of fluid pressure is again connected with the line 37; this movement of the element 30 also interrupts communication between the source of fluid pressure and the lower end of the power cylinder which results in stopping the upward movement of the ram.

An inspection of the above-mentioned copending application will also disclose mechanism for causing the ram to execute one or more short reciprocations upon the completion of an initial downward or power stroke; this mechanism is indicated generally by the letter F in Fig. 1 of the present drawings. This mechanism F will not be described in detail herein, it being sufficient to state that such mechanism includes an "on and off" piston valve 42, which controls fluid flow through a line 43, leading from the source of fluid pressure to ports extending to the space at the lower end of the valve element 31. Valve 42 is operated by fluid pressure to move to an open position when fluid is directed to the under side of the piston for the ram 22 to cause it to retract. When valve 42 is open fluid from the source of pressure will be directed through line G or 43 into the space beneath the valve element 31 causing this element to move to an elevated position wherein communication between the pressure source and the lower end of the power cylinder is interrupted, while communication between the source and the upper end of the power cylinder is established. When valve element 31 is elevated the ram will be immediately started in a downward direction as previously described. The distance the ram is retracted before element 31 is elevated will be determined by the length of time it takes to move valve 42 to an open position to supply fluid to the space beneath the valve 31 to effect its elevation. This short reciprocatory movement of the ram will be repeated as many times as valve element 42 is operated, unless flow through line G or 43 is otherwise interrupted.

For the purposes of the present invention, provision is made to interrupt the flow though line G, in the form of a solenoid valve indicated by the numeral 44, or letter K. Valve 44 is normally disposed in an open position to permit fluid flow through line G. It is closed by energizing the solenoid of the valve through the actuation of a limit switch 45 or Q, which in this instance has an operating extremity located in the path of movement of a cam 49 provided on the cross head 35. The location of the switch 45 is such as to permit the ram of the press to move to compress ceramic material in the mold and form a body of predetermined thickness. After limit switch 45 has been tripped, solenoid valve 44 will close preventing fluid flow through line 43 and the elevation of valve element 31 allowing it to remain in a lowered position wherein it directs fluid from the source to the under side of the ram piston and causes the complete retraction of the ram. Except for the solenoid valve 44 and limit switch 45, the press and operating circuit 23 are substantially identical with the preferred form of the invention shown in the copending application, Serial No. 25,948. Limit switch 45 determines the thickness of a formed body, since it limits the extent of travel of the ram of the press. Of course, the density of the article or body will depend in a large measure upon the quantity of raw material introduced into the mold 46 before the ram 22 performs its cycle of operation.

The present invention is directed to means for regulating the quantity of material introduced into mold 46. This regulation is accomplished by varying the position at which the knock-out ram 47 is stopped in its retractive movement. This knock-out ram serves a double purpose in that it constitutes a movable wall or bottom for the mold 46 to vary the volume of the mold and ejects the formed article therefrom. The ram 47 is actuated by a power cylinder 48 in which a piston 50 is disposed for movement, this piston being connected to the lower end of ram 47.

In the present illustration of one embodiment of the invention, a separate source of fluid pressure is provided to actuate the knock-out ram, this separate source of fluid pressure being indicated generally by the numeral 51. It includes a reservoir 52, a motor driven pump 53 and a relief valve 54, a fluid line 55 extending from the reservoir to the pump and from the latter to the relief valve. Another fluid line 56 extends from the relief valve to a four-way valve 57 employed to control the flow of fluid from the source 51 to the power cylinder 48. Valve 57 is a spring off-set solenoid valve having a casing 58 and a spool 60. The casing 58 has an inlet port 61 communicating with line 56, top and bottom cylinder ports 62 and 63 and exhaust ports 59, port 62 being connected with the upper end of cylinder 48 by line 64, while line 65 connects the bottom cylinder port 63 with the lower end of cylinder 48. A spring in valve 57 normally tends to urge the spool 60 toward a position in which the inlet port 61 is connected with the top cylinder port 62. When the spool is so positioned the source of fluid pressure will be connected with the upper end of power cylinder 48, while the lower end of the cylinder will be connected with reservoir 52. Fluid from the pressure source will then move piston 50 in a downward direction, which will cause ram 47 to be retracted in mold 46. This movement of the ram is interrupted by moving valve spool in opposition to its spring to a centered position in which the top and bottom cylinder ports no longer communicate with the inlet or outlet ports.

The spool is moved to this position by a push rod 66 and a bell crank 67, the latter being pivotally secured to the casing 58 and having one arm thereof connected to an extension of the spool 60. The other arm of the bell crank is connected with the push rod 66 which has a roller 68 journalled therein at the end opposite that connected to the bell crank. Roller 68 is arranged in the path of movement of a cam 70 secured to the ram 47. The push rod 66 is mounted for sliding movement in a member 71, which is made adjustable longitudinally relative to the ram 47 for purposes to be set forth hereinafter. It will be obvious from an inspection of Fig. 1 that when ram 47 is being retracted, cam 70 will engage roller 68 and move push rod outwardly away from the ram. This movement will be transmitted by bell crank 67 to spool 60 to move the same to center position in opposition to its spring. As soon as spool 60 is centered fluid flow to cylinder 48 will be interrupted and ram 47 will come to rest. The extent of movement of ram 47 before such movement is interrupted will determine the volume of mold 46.

Prior to the initiation of operation of the press ram 22, powdered ceramic or other material will be inserted in the mold; this powdered material may be introduced in any suitable manner, one form of charging device being illustrated in the copending application of Willard K. Carter, Serial No. 790,165, filed December 6, 1947, now Patent No. 2,569,227, which application has also been assigned to the assignee of the present application. The charging device comprises a transfer box (not shown) which is disposed for sliding movement between a hopper (not shown) in which the powdered material is stored, to a point over the mold. The box contains more than sufficient material to completely fill the space in the mold above the end of the ram 47, the movement of the transfer box away from the mold serving to strike off the material level with the top of the mold. It should be obvious that by varying the point at which ram 47 stops during retraction, the quantity of raw material may be also varied. After the material has been supplied to the mold 46, the press is operated to cause a power stroke of ram 22 to be initiated; as the power stroke progresses this ram will enter the mold 46 and apply compressing force to the material therein. As the material is compressed, the force of ram 22 will be transmitted through the material to the knock-out ram 47 causing it to move in a downward direction until a shoulder 69 on the ram engages a shoulder 72 formed in the mold. This additional retractive movement of ram 47 is made possible by providing a relief valve 73 in line 65, which is connected with the bottom of the cylinder 48. When shoulders 69 and 72 are disposed in engagement ram 47 can not retract any further and ram 22 may then exert its full force, determined by the setting of relief valve 38, on the material in the mold.

As pointed out in the above-mentioned copending application Serial No. 29,548, the press 23 may be provided with a second relief valve 74, which is employed to control the force exerted by the ram 22 on its initial power stroke. This relief valve is rendered inoperative, however, after the first power stroke in the manner set forth in the copending application. Mechanism for rendering relief valve 74 inoperative forms a part of mechanism 41 and for more detailed description thereof, reference may be had to the copending application. The short pressing impulses following the initial pressing impulse are executed at the pressure controlled by the relief valve 38, this relief valve being set for higher pressure than that of relief valve 74. Also as set forth in the copending application, valve mechanism 41 is provided with means for counting the number of short pressing impulses executed by the ram. This mechanism is indicated generally by the numeral 75 and is also described in detail in the copending application. This mechanism 75 is adjustable to cause the press ram to discontinue the short pressing impulses after a predetermined number thereof have been executed. With the present system of operation, the mechanism 75 is set to permit the execution of a predetermined number of pressing impulses, for example, a maximum of seven, so that in the event more than such maximum number of impulses are required to reduce the material in mold 46 to an article having the predetermined thickness, the pressing impulses will be discontinued even though the limit switch 45 has not been actuated. In such event the press ram will return to its elevated starting position, as a result of the operation of mechanism 75.

Figure 5:
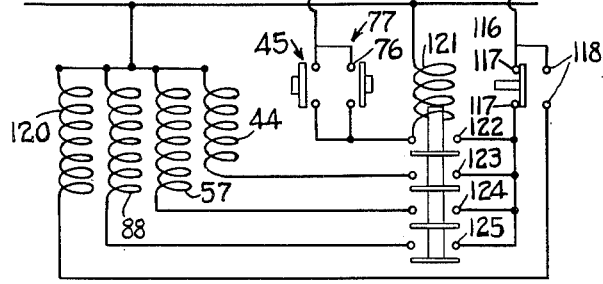
Fig. 5 is a wiring diagram showing the circuit used in the operation of the automatic fill mechanism forming the subject matter of the invention.

As mentioned previously, when the counting mechanism 75 causes the short pressing strokes to be discontinued and the ram 22 to retract, it is necessary for the operator to close switch 76, shown in the circuit 77 in Fig. 5 which circuit also includes switch 45 and the field coil of the solenoid operated valve 44, to effect the ejection of the formed article.

According to the present invention, means have been provided to automatically change the point at which knock-out ram 47 stops in its retractive movement to vary the volume of the mold 46. By so changing the stopping point of ram 47, the density of the articles may also be varied. It has previously been pointed out that if knock-out ram 47 is interrupted early in its retractive movement, less powdered material will be introduced to the mold, than if the stopping of the ram 47 is delayed. It has been found that a certain minimum number of short pressing impulses produces an article having the best characteristics and it is, therefore, desired to cause ram 22 to at least execute such limited number of pressing impulses. To vary the stopping point of the knock-out ram 47, means, indicated generally by the numeral 78, have been provided to adjust the guide 71. In the present instance, which merely illustrates the invention diagrammatically, this means includes internal threads 79 formed in the member 71 for the reception of a screw 80. This screw is carried by the shaft of a fluid motor 81, the member 71 being supported for longitudinal non-rotative movement. It will be obvious that when the fluid motor operates, the screw 80 will turn and the reaction of the threads of such screw with those in the member 71 will cause the latter to move up or down depending upon the direction of the rotation of the fluid motor. If the member 71 moves in an upward direction, ram 47 will be stopped earlier in its retractive movement, than if the member 71 is lowered.

To effect the operation of the fluid motor 81 a separate source of fluid pressure, indicated by the numeral 82, has been provided. It should be obvious that in the practical application of the invention, a single source of fluid pressure for the operation of the press, the knock-out and the adjusting mechanism could be employed, a separate source for each of these units being illustrated for convenience only. The pressure source 82 includes the reservoir 83, a pump 84 and a relief valve 85, these elements being connected by a line 86. Another line 87 leads from the relief valve 85 to a solenoid valve, indicated by the numeral 88. The inlet of the solenoid valve 88 is connected with line 87 and one outlet thereof is connected by line 89 with the inlet of a four-way valve 90. This four-way valve has right and left motor ports 91 and 92, respectively, which are connected by lines 93 and 94, with the combination inlet and outlet ports of the fluid motor 81. The introduction of fluid through either of lines 93 and 94 will effect the operation of the fluid motor 81, the direction of operation depending upon which line receives fluid from the source. The other line will be connected with the reservoir through line 95, by the valve 90.

Under normal conditions solenoid valve 88 is disposed in a position wherein fluid from the pressure source flows directly to the reservoir 83. This valve is operated to connect line 89 with the pressure source when the limit switch 45 is actuated by the ram after pressing the article being formed to the predetermined thickness. Valve 88 controls the admission of fluid from the source 83 to the fluid motor 81; the direction of operation of this motor depends upon the number of pressing impulses delivered to the article formed immediately prior to the opening of valve 88. The direction of rotation of fluid motor is controlled by the valve 90.

Figure 2:
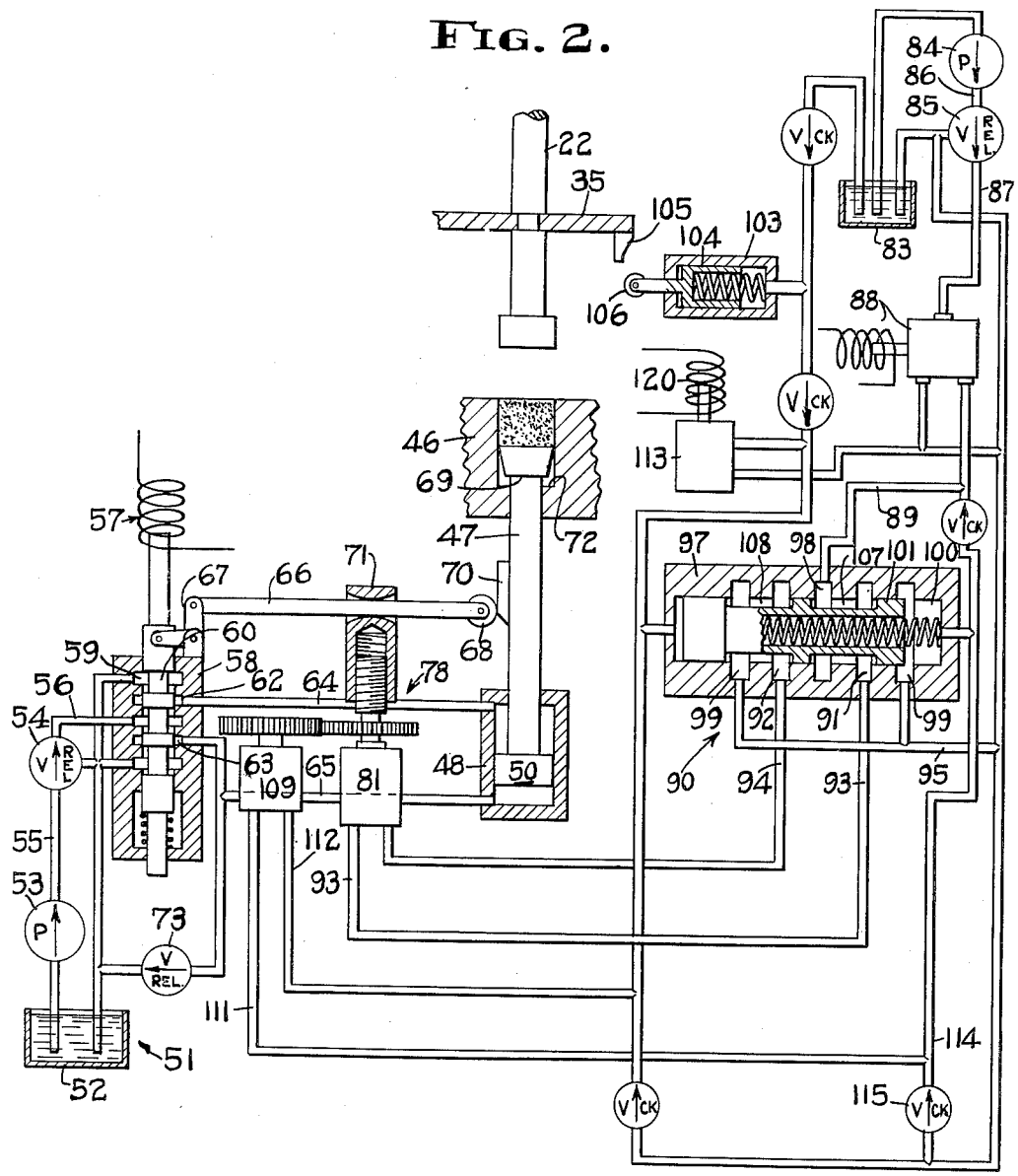
Fig. 2 is a diagrammatic view of the portion of the hydraulic system employed to operate the knock-out mechanism provided in the apparatus and means for adjusting a stop for the knock-out mechanism to vary the volume of the mold in which the ceramic articles are formed, certain parts of the mechanism used in the system being shown in section in one position of operation.
Figure 3:
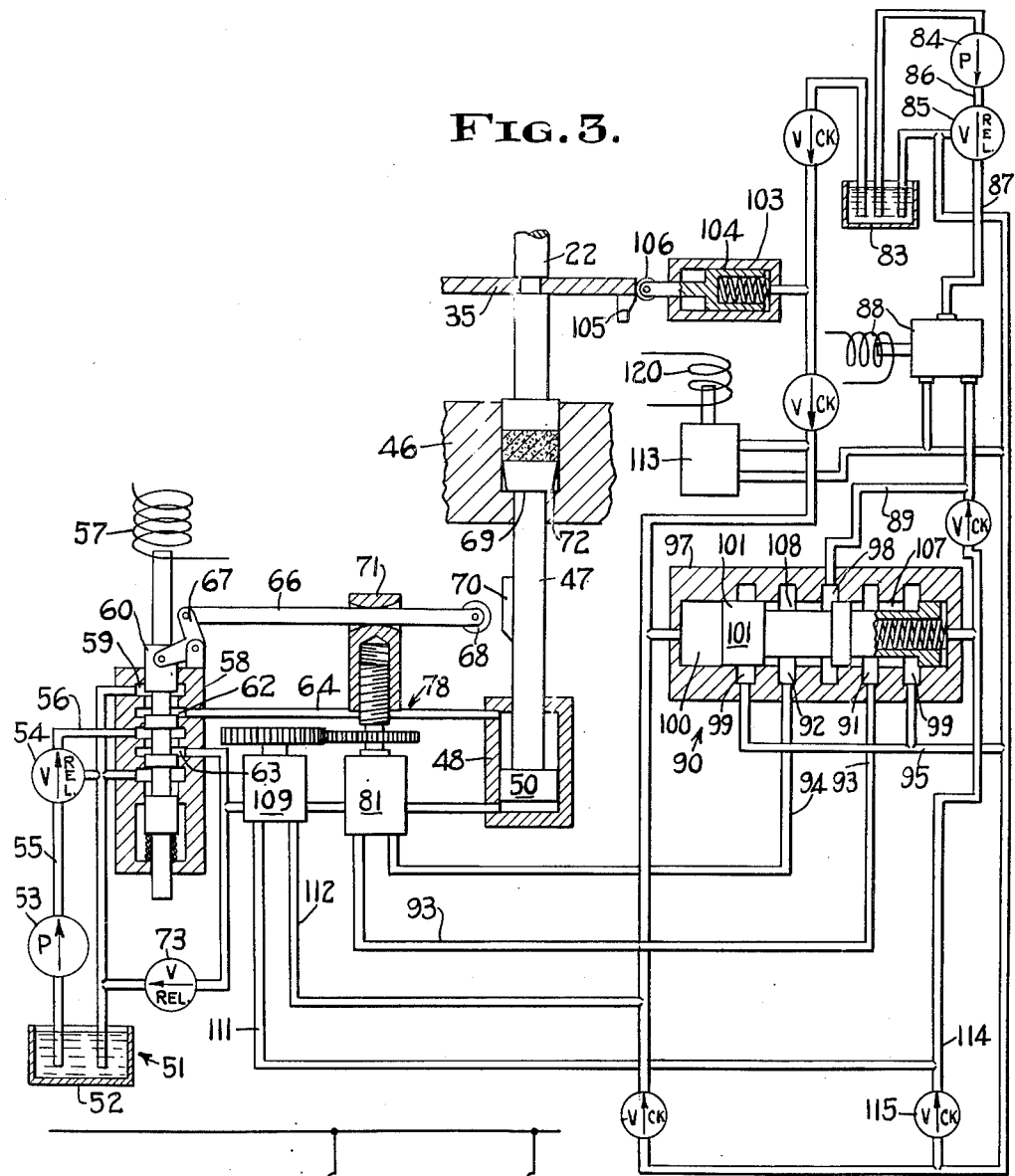
Fig. 3 is a view similar to Fig. 2 in which the parts of the mechanism are shown in other positions of movement during the formation of a ceramic article.

This valve 90 is shown in section in Figs. 2, 3, and 4, and from these figures it will be observed that the valve includes a casing 97 and an inlet port 98 connected with line 89, motor ports 91 and 92, previously mentioned, and exhaust ports 99. Casing 97 has a bore 100 in which a valve spool 101 is disposed for sliding movement to connect certain sets of the ports in the casing. The valve spool 101 is normally disposed at the left end of the casing 97, as shown in Fig. 2, where it is yieldably held by a coil spring 102. Spool 101 is moved in step-by-step order through the repeated introduction of fluid into the left end of the casing 97 in response to the execution of pressing impulses by the ram 22.

In the embodiment of the invention illustrated, a pump 103 which is actuated by the movement of the ram 22 serves to supply the fluid for moving the spool. Pump 103 includes a plunger 104, which is capable of moving a predetermined distance upon each actuation so that a fixed quantity of fluid will be introduced to the casing 97 upon each reciprocation of the ram 22. Cross head 35 has a cam 105 thereon to actuate the plunger 104 through engagement with a roller 106, carried by such plunger.

It will be obvious that the distance moved by the spool 101 will depend upon the number of pressing impulses executed by the ram 22. When the spool 101 is in its normal position, a groove 107 therein is disposed in position to connect line 89 with line 93. If less than the predetermined minimum number of pressing impulses are executed by ram 22 in the formation of an article, it will not possess the required density and spool 101 will remain in position to connect lines 89 and 93. Then when valve 88 is actuated due to the closing of switch 45 by the ram 22, fluid will be supplied by source 82 to fluid motor 81 to cause it to rotate in the direction necessary to adjust the mechanism to stop the knock-out ram 47 in such a position that more raw material than was introduced in the preceding pressing cycle will be introduced into the mold 46. This material will then have to be pressed a greater number of times to form an article and it will consequently have a greater density. Should the ram 22 be required to execute too many pressing impulses due to too much raw material having been supplied to this mold, the spool 101 will be moved far enough to the right, as viewed in the drawing, to permit a groove 108 therein to establish communication between the line 89 and line 94. When valve 88 is actuated after spool 101 has been moved to such an extent, fluid from the source 82 will cause the motor 81 to rotate in a direction which will adjust the guide 71 to a point to stop ram 47 earlier in its retraction, so that less raw material may be supplied to the mold 46. The ram 22 will then be required to execute a lesser number of pressing impulses to reduce the material to an article having the required thickness. When the optimum number of impulses have been executed by the ram 22 to form an article of the desired density and thickness, spool 101 will be disposed in a centered position wherein the inlet port or line 89 is blocked from communicating with either of lines 93 and 94. With the valve spool 101 in this position the opening of solenoid valve 88 will have no effect and the stopping mechanism for ram 47 will remain in the same position of adjustment.

From the foregoing, it will be clear that the valve 90 will determine the direction of adjustment of the knock-out ram stop mechanism depending upon the number of pressing impulses applied in the formation of an article. If too few pressing impulses are applied due to the introduction of too little raw material to produce an article having the requisite density, valve 90 will cause the stop mechanism to be adjusted toward a position to provide for the introduction of more raw material. The stop mechanism will be adjusted a small degree each time an article is formed, being adjusted toward the appropriate position for the formation of an article having the desired dimension and density. If too many impulses are executed the stop mechanism will be adjusted toward a position to permit less raw material to be introduced into the mold. When the proper amount of raw material has been provided and the number of pressing impulses produces an article having the requisite density, valve 90 will be so positioned that the stop mechanism will not be adjusted. If the raw material should vary so that the density of the article would be changed, more or less pressing impulses would be executed which would cause the valve 90 to operate to again adjust the stop mechanism.

The operation of motor 81 is limited depending upon the extent of movement of valve spool 101. It was described above how valve spool 101 is moved step-by-step through the execution of pressing impulses by ram 22. It was also pointed out that if few impulses were executed, valve spool 101 would not move far enough to block line 89 from communicating with line 93, then when solenoid valve 88 opened, fluid motor 81 would be operated in the direction necessary to properly adjust the stop mechanism. During the operation of fluid motor 81, it is necessary to move spool 101 to a position to block communication between line 89 and lines 93 or 94, to prevent overadjustment of the stop mechanism.

This adjustment of spool 101 is accomplished by providing a pump 109 which is driven in unison with motor 81 by gears 110. This pump includes a pair of combined inlet and outlet lines 111 and 112, which lead to the opposite ends of the casing 97; when fluid motor 81 operates in one direction pump 109 will be operated to withdraw fluid from one end of casing 97 and supply it to the opposite end thereof. By this pumping of fluid from one end of the casing to the other, valve spool 101 will be caused to move toward a centered position. When it reaches such position, communication between the inlet line 89 and lines 93 and 94 will be blocked and operation of motor 81 will be discontinued. Pump 109 will also then cease to operate.

Before another cycle of movement of ram 22 is initiated, it is necessary to set valve 90 for the next succeeding operation. This setting is accomplished by opening a solenoid valve 113 to connect line 111 with the reservoir. The establishment of this connection permits spring 102 to move valve spool 101 to the left in casing 97, in which position groove 107 again connects line 89 with line 93. When valve spool 101 is moved by spring 102 "make-up" fluid will be drawn into the casing from reservoir 83 through a branch line 114, which contains a check valve 115. Solenoid valve 113 is controlled in the embodiment of the invention illustrated, by a manually operated switch 116 arranged in the electrical circuit as shown in Fig. 5. The switch 116 is to be operated after the ram has been retracted and the formed article ejected from the mold. It will be noted from the wiring diagram in Fig. 5, that switch 116 is a double throw switch and has a pair of contacts 117 which are normally connected to complete the circuit for the solenoid valves 44, 57, and 88 when the limit switch 45 is closed. The other pair of contacts 118 control current flow to the field coil 120 of the solenoid valve 113. Switch 116 is normally disposed to complete the circuit branch containing switch 45 and when actuated will open such circuit interrupting current flow to the field coils of solenoid valves 44, 57 and 88. At this time valve 44 will shift back to the position wherein flow through line 43 may take place when valve 42 is opened, valve 57 will shift to the position to cause the retraction of the knock-out ram, which action will be automatically interrupted when the cam 79 engages and moves roller 66 and rod 65 causing valve spool 69 to be centered and valve 88 will shift to prevent further operation of motor 81 by directing the output of pump 84 to the reservoir 83.

By connecting contacts 118, field coil 120 of solenoid valve 113 will be energized and the valve opened to permit spool 101 of valve 90 to be reset for the next cycle of operation of the apparatus.

As shown in Fig. 5 switch 45 controls current flow to relay coil 121 which, when energized, causes the closing of switches 122 to 125, inclusive. Switch 122 maintains the circuit for coil 121; switch 123 controls a circuit branch including the field coil of solenoid valve 44; switch 124 controls the circuit branch for the field coil of the solenoid valve 57 and switch 125 controls the circuit branch for the field coil of the solenoid valve 88. When limit switch 45 is operated by the ram, all of the switches 122 to 125, inclusive, close simultaneously. When switch 116 is actuated to close the circuit for the solenoid of valve 113 all of switches 122 to 125, inclusive, open simultaneously.

While in the preferred embodiment of the invention, the adjustment of the stop mechanism is regulated in response to the number of pressing impulses applied to the article being formed, it is within the concept of the invention to apply but one pressing impulse and have the adjustment of the stop mechanism determined by the extent of movement of the press ram. This type of operation could be secured by constructing the pump 103 in such manner that the movement of the ram 22 would effect proportional movement of the pump piston and this movement would be hydraulically transmitted to the valve spool 101. This spool would not then be moved in a step-by-step manner but moved in one single operation. It would move depending upon the distance moved by the ram, to a centered or one or the other side of a centered position in the same manner as illustrated herein, the centered position providing for the retention of the stop mechanism in a desired position.

While the form of embodiment of the present invention as herein disclosed constitutes a preferred form, it is to be understood that other forms might be adopted, all coming within the scope of the claims which follow.

I claim:

1. Apparatus for forming ceramic bodies comprising a press with a movable ram; a mold for receiving powdered material; means for moving said ram into and reciprocating the same in said mold to compress material therein and form a body; a knock out ram disposed for movement through said mold to eject formed bodies therefrom, said knock out ram serving as a movable wall of said mold to regulate the material-receiving capacity thereof; means for projecting and retracting said knock out ram relative to said mold to eject formed bodies therefrom and place said mold in condition to receive material for another body; means for controlling said knock out ram operating means, said controlling means stopping said knock out ram during retraction thereof to fix the capacity of the mold; and means controlled by the number of reciprocations of the first-mentioned ram in said mold for adjusting said controlling means to vary the stopping point of said knock-out ram.

2. Apparatus for forming ceramic bodies comprising a press with a movable ram; a mold for receiving powdered material; means for moving said ram into and reciprocating the same in said mold to compress material therein and form a body; a knock out ram disposed for movement through said mold to eject formed bodies therefrom, said knock out ram serving as a movable wall of said mold to regulate the material-receiving capacity thereof; means for projecting and retracting said knock out ram relative to said mold to eject formed bodies therefrom and place said mold in condition to receive material for another body, said last-named means having a reversible fluid motor; control valve mechanism for regulating fluid flow to said motor, said control valve mechanism being operative to stop said motor during the retraction of said knock out ram to fix the capacity of said mold; and means controlled by the number of reciprocations of the first-mentioned ram in said mold for adjusting said control valve mechanism to vary the stopping point of said knock-out ram.

3. Apparatus for forming ceramic bodies comprising a press with a movable ram; a mold for receiving powdered material; means for moving said ram into and reciprocating the same in said mold to compress material therein and form a body; a knock out ram disposed for movement through said mold to eject formed bodies therefrom, said knock out ram serving as a movable wall of said mold to regulate the material-receiving capacity thereof; means for projecting and retracting said knock out ram relative to said mold to eject formed bodies therefrom and place said mold in condition to receive material for another body, said last-named means having a reversible fluid motor; control valve mechanism for regulating fluid flow to said motor, said control valve mechanism being operated by said knock out ram during retraction thereof to stop said fluid motor and knock out ram to fix the capacity of said mold; means controlled by the number of reciprocations of said first-mentioned ram in said mold for adjusting said control valve mechanism to vary the stopping point of said knock-out ram; and means forming a part of the last-named means and actuated by the first-mentioned ram for selecting the direction of variation of the stopping point of said knock-out ram.

4. Apparatus for forming ceramic bodies comprising a press with a movable ram; a mold for receiving powdered material; means for moving said ram into and reciprocating the same in said mold to compress material therein and form a body; a knock-out ram disposed for movement through said mold to eject formed bodies therefrom, said knock-out ram serving as a movable wall of said mold to regulate the material-receiving capacity thereof; means for projecting and retracting said knock-out ram relative to said mold to eject formed bodies therefrom and place said mold in condition to receive material for another body, said last-named means having a reversible fluid motor; control valve mechanism for regulating fluid flow to said motor, said control valve mechanism being operated by said knock-out ram during retraction thereof to stop said fluid motor and knock-out ram to fix the capacity of said mold; means controlled by the number of reciprocations of said first-mentioned ram for adjusting said control valve mechanism to vary the stopping point of said knock-out ram; means forming a part of the last-named means and actuated by the first-mentioned ram for selecting the direction of variation of the stopping point of said knock-out ram; and means to set said direction selecting means for the next succeeding operation.

5. Apparatus for forming ceramic bodies comprising a press with a movable ram; a mold for receiving powdered material; means for moving said ram into and reciprocating the same in said mold to compress material therein and form a body; a knock out ram disposed for movement through said mold to eject formed bodies therefrom, said knock out ram serving as a movable wall of said mold to regulate the material-receiving capacity thereof; means for projecting and retracting said knock out ram relative to said mold to eject formed bodies therefrom and place said mold in condition to receive material for another body, said last-named means having a power cylinder with a piston connected to said knock out ram; mechanism for controlling the operation of said power cylinder, said mechanism being operative to stop said knock-out ram during retraction thereof to fix the capacity of said mold; means for adjusting said controlling mechanism to vary the point at which said knock out ram is stopped, said means having a reversible fluid motor; and means responsive to the number of reciprocations of the first-mentioned ram for selecting the direction of operation of said reversible fluid motor.

6. Apparatus for forming ceramic bodies comprising a press with a movable ram; a mold for receiving powdered material; means for moving said ram into and reciprocating the same in said mold to compress material therein and form a body; a knock out ram disposed for movement through said mold to eject formed bodies therefrom, said knock out ram serving as a movable wall of said mold to regulate the material-receiving capacity thereof; means for projecting and retracting said knock out ram relative to said mold to eject formed bodies therefrom and place said mold in condition to receive material for another body, said last-named means having a power cylinder with a piston connected to said knock out ram; valve mechanism for controlling the operation of said power cylinder, said valve mechanism being operated by said knock-out ram to stop such ram during retraction thereof to fix the capacity of said mold; means for adjusting the valve operating mechanism to vary the point at which said knock out ram is stopped, said adjusting means having a reversible fluid motor; means responsive to the number of reciprocations of the first-mentioned ram for selecting the direction of operation of said reversible fluid motor, said means serving to prevent operation of said reversible fluid motor when said first-mentioned ram moves in a predetermined manner.

7. Apparatus for forming ceramic bodies comprising a press with a movable ram; a mold for receiving powdered material; means for moving said ram into and out of said mold to compress material therein and form a body; control means for said ram moving means, said control means being operative to cause said ram to exert a plurality of pressing impulses on the material in said mold in the formation of an article; a knock out ram disposed for movement in said mold to eject formed bodies therefrom, said knock out ram serving as a movable wall of said mold to regulate the material-receiving capacity thereof; means for moving said knock out ram to eject formed articles and retract the knock out ram in said mold; means for interrupting the knock out ram moving means during the retraction of said knock out ram to fix the capacity of said mold; means for adjusting said last-mentioned means to vary the stopping point of said knock out ram, said means being operative to adjust said interrupting means in either of two directions; and means responsive to the number of pressing impulses imparted by said first-mentioned ram for selecting the direction of adjustment of said stop means, a predetermined number of pressing impulses serving to render said adjusting means inoperative.

8. Apparatus for forming ceramic bodies comprising a press with a movable ram; a mold for receiving powdered material; means for moving said ram into and out of said mold to compress material therein and form a body; control means for said ram moving means, said control means being operative to cause said ram to exert a plurality of pressing impulses on the material in said mold in the formation of an article; a knock out ram disposed for movement in said mold to eject formed bodies therefrom, said knock out ram serving as a movable wall of said mold to regulate the material-receiving capacity thereof; a power cylinder having a piston connected to said knock out ram; a four-way valve controlling the direction of movement of said piston and knock-out ram; valve actuating means operated by said knock out ram during retraction thereof to move said four-way valve to a position to stop said knock-out ram to fix the capacity of said mold; means for adjusting said valve actuating means to vary the stopping point of said knock out ram, said means having a reversible fluid motor, rotation of said motor in one direction serving to adjust the valve actuating means to increase the capacity of the mold, rotation of said motor in the opposite direction serving to decrease the capacity of the mold; means responsive to the execution of pressing impulses by the first-mentioned ram to select the direction of rotation of said fluid motor, said selecting means having a four-way valve, the execution by the first-mentioned ram of a predetermined number of pressing impulses serving to place said last-mentioned valve in condition to preclude operation of said fluid motor, a lesser number of such impulses placing said valve in condition to cause rotation of said fluid motor in one direction, and a greater number of pressing impulses placing said valve in condition to cause rotation of said fluid motor in the opposite direction.

9. Apparatus for forming ceramic bodies comprising a press with a movable ram; a mold for receiving powdered material and the ram in the formation of a body; a knock out ram movable relative to said mold to eject the formed body therefrom, said knock out ram also serving as an adjustable wall for said mold to vary the material receiving capacity thereof; a first means for moving said first-mentioned ram into said mold and reciprocating the same to compress material therein and form a body; a second means for moving said knock out ram to eject the formed body, said second means having a power cylinder; a source of fluid pressure; a control valve between said power cylinder and said source of fluid pressure; a third means actuated by said power cylinder for operating said valve to control fluid flow from said source to said power cylinder, said valve serving to locate said knock out ram to determine the quantity of powdered material to be received by said mold; and a fourth means governed by the number of reciprocations of the first-mentioned ram for adjusting said third means to vary the point at which said valve means locates said knock out ram.

10. Apparatus for forming articles from powdered materials comprising a mold; a ram disposed for movement into and out of said mold; means for moving said ram into said mold and imparting reciprocatory movement thereto while in the mold to apply a series of pressing impulses to the powdered material; a knock-out plunger movably disposed in said mold; means for moving said knock-out plunger to eject a formed article from said mold and retract said plunger into the mold; means for stopping said knock-out plunger during the retraction thereof to determine the quantity of powdered material received by said mold for the next article; means for adjusting said plunger stopping means to vary the stopping point of said plunger; and means regulated by the number of pressing impulses imparted by said ram to control said plunger stop adjusting means.

11. Apparatus for forming articles from powdered materials comprising a hydraulic press having a mold; a ram; means for moving said ram into and out of said mold; and control means for said ram to cause it to reciprocate while in said mold and impart a series of pressing impulses to the powdered material; a knock-out plunger movably disposed in said mold; a hydraulically operated means for moving said knock-out plunger to eject a formed article from said mold and retracting said plunger into the mold; stop means for interrupting the retraction of said plunger to determine the quantity of powdered material to be received by said mold for the next article; adjusting means for said stop means to vary the stopping point of said plunger, said adjusting means being operative to adjust said stop means in either of two directions; and hydraulically actuated means responsive to the number of pressing impulses imparted to said powdered material in the formation of an article to determine the direction of adjustment of said stop means.

12. Apparatus for forming articles from powdered materials comprising a mold; a ram disposed for movement into and out of said mold; means for moving said ram into said mold and imparting reciprocatory movement thereto while in the mold to apply a series of pressing impulses to the powdered material; a knock-out plunger movably disposed in said mold; means for moving said knock-out plunger to eject a formed article from said mold and retract said plunger into the mold; control mechanism for said knock-out plunger moving means, said control mechanism having a four-way valve; motion transmitting mechanism between said knock-out plunger moving means and said four-way valve and operative to actuate said four-way valve to stop said knock-out plunger when the same reaches a predetermined position during retraction; reversible motor driven means for adjusting said motion transmitting mechanism to vary the point in the retraction of the knock-out plunger at which the motion transmitting mechanism operates said four-way valve; and control mechanism for selecting the direction and length of operation of said reversible motor driven means, said last-mentioned control mechanism being responsive to the number of reciprocations of said ram in said mold.

13. Apparatus for forming articles from powdered materials comprising a mold; a ram disposed for movement into and out of said mold; means for moving said ram into said mold and imparting reciprocatory movement thereto while in the mold to apply a series of pressing impulses to the powdered material; a knock-out plunger movably disposed in said mold; means for moving said knock-out plunger to eject a formed article from said mold and retract said plunger into the mold; control mechanism for said knock-out plunger moving means, said control mechanism having a four-way valve; motion transmitting mechanism between said knock-out plunger moving means and said four-way valve and operative to actuate said four-way valve to stop said knock-out plunger when the same reaches a predetermined position during retraction; reversible motor driven means for adjusting said motion transmitting mechanism to vary the point in the retraction of the knock-out plunger at which the motion transmitting mechanism operates said four-way valve; control mechanism for selecting the direction and length of operation of said reversible motor driven means, said last-mentioned control mechanism having a distributing valve connected with said reversible motor; and pump means operated by said ram for hydraulically adjusting said distributing valve by increments in response to the reciprocations of said ram.

14. Apparatus for forming articles from powdered materials comprising a mold; a ram disposed for movement into and out of said mold; means for moving said ram into said mold and imparting reciprocatory movement thereto while in the mold to apply a series of pressing impulses to the powdered material to progressively reduce one dimension of the article being formed; electro-responsive means for interrupting the reciprocatory operations of said ram when the article being formed reaches a predetermined size; a knock-out plunger movably disposed in said mold; fluid pressure responsive means for moving said knock-out plunger to eject a formed article from said mold and retract said plunger into the mold; control mechanism for said fluid pressure responsive means having a four-way valve; motion-transmitting mechanism between said fluid pressure responsive means and said four-way valve, said motion transmitting means being operative to actuate said valve to stop said knock-out plunger at a predetermined point in the retraction thereof; fluid pressure responsive adjusting means for said motion transmitting means to vary the point at which said four-way valve is actuated to interrupt the retraction of said knock-out plunger; control mechanism for selecting the direction and length of operation of said last-mentioned fluid pressure responsive adjusting means; pump means operated by said ram for hydraulically adjusting said last-mentioned control means by increments in response to the reciprocations of said ram; and a second electro-responsive means operative when said electro-responsive ram interrupting means is actuated to initiate the operation of said fluid pressure responsive adjusting means.

CECIL E. ADAMS.

REFERENCES CITED

The following references are of record in the file of this patent:

UNITED STATES PATENTS

| Number | Name | Date |
|---|---|---|
| 2,256,793 | Yeakel | Sept. 23, 1941 |
| 2,368,756 | Flowers | Feb. 6, 1945 |
| 2,455,823 | Tauber et al. | Dec. 7, 1948 |
| 2,489,069 | Adams et al. | Nov. 22, 1949 |